United States Patent [19]

Clark et al.

[11] Patent Number: 4,769,079

[45] Date of Patent: * Sep. 6, 1988

[54] INSOLUBLE PIGMENTS AND PREPARATION THEREOF

[75] Inventors: Howard W. Clark; Tracy E. Chapman; Ronald L. Yates, all of Midland, Mich.

[73] Assignee: The Dow Chemical Company, Midland, Mich.

[*] Notice: The portion of the term of this patent subsequent to Sep. 6, 2005 has been disclaimed.

[21] Appl. No.: 876,604

[22] Filed: Jun. 20, 1986

Related U.S. Application Data

[63] Continuation-in-part of Ser. No. 748,275, Jun. 24, 1985, abandoned.

[51] Int. Cl.$^4$ .................. C09C 1/02; C09C 3/08
[52] U.S. Cl. .................. 106/402 A; 106/501; 106/471; 106/432; 106/447; 106/450; 106/479; 210/683; 252/175; 252/179; 252/184; 423/463; 423/467; 423/593; 423/600
[58] Field of Search ............... 106/288, 289; 423/463, 423/467, 593, 600; 210/683; 252/175, 179, 184

[56] References Cited

U.S. PATENT DOCUMENTS

| | | | |
|---|---|---|---|
| 2,213,641 | 9/1940 | Tainton | 252/89 |
| 2,561,695 | 7/1951 | Gustafson | 127/46 |
| 3,002,932 | 10/1961 | Duwell et al. | 252/179 |
| 3,879,525 | 4/1975 | Miyata et al. | 423/600 |
| 3,907,715 | 9/1975 | Arai et al. | 252/465 |
| 4,065,257 | 12/1977 | Coe et al. | 8/74 |
| 4,121,903 | 10/1978 | Smolka | 8/137 |
| 4,145,400 | 3/1979 | Adsetts | 423/600 |
| 4,216,084 | 8/1980 | Ikari et al. | 210/32 |
| 4,277,346 | 7/1981 | Sakotani et al. | 210/691 |
| 4,299,739 | 11/1981 | Esposito et al. | 252/545 |
| 4,326,961 | 4/1982 | Lee et al. | 210/683 |
| 4,326,978 | 4/1982 | Moesch | 252/107 |
| 4,380,453 | 4/1983 | Claiborne | 8/606 |
| 4,661,282 | 4/1987 | Clark | 106/288 B |

FOREIGN PATENT DOCUMENTS

| | | |
|---|---|---|
| 44003 | 1/1982 | European Pat. Off. |
| 2309099 | 8/1973 | Fed. Rep. of Germany |
| 132794 | 11/1978 | Fed. Rep. of Germany |
| 2726192 | 12/1978 | Fed. Rep. of Germany |
| 2814329 | 10/1979 | Fed. Rep. of Germany |
| 47-42493 | 12/1972 | Japan |
| 48-8394 | 3/1973 | Japan |
| 48-29477 | 9/1973 | Japan |
| 48-369780 | 9/1973 | Japan |
| 48-69797 | 9/1973 | Japan |
| 49-3760 | 1/1974 | Japan |
| 51-20997 | 6/1976 | Japan |
| 51-29129 | 8/1976 | Japan |
| 53-19555 | 6/1978 | Japan |
| 56-98265 | 8/1981 | Japan |
| 1544430 | 4/1979 | United Kingdom |
| 517567 | 6/1976 | U.S.S.R. |

OTHER PUBLICATIONS

Marino et al., "Thermal Stability of Magnesium, Aluminum Double Hydroxides Modified by Anionic Exchange," Thermochim. Acta 1982, p. 55(3), 377–383.

Chemical Abstract 92:135932a "Alumina as an Ion-Exchanger and its Application, Part III, Ph and Adsorption of Anionic Dyes by Alumina".

Chemical Abstract 94:144763q "Advanced Treatment of Dye Waste Water by Adsorption".

Chemical Abstract 92:112623m "Application of Sodium Aluminum Silicates in Detergents, Part VIII, Dye Equilibriums in Multicomponent Systems".

Chemical Abstract 89:79636f "Treatment of Dye-Containing Waste Water with Magnesium Compound Adsorbents".

Chemical Abstract 93:79029t "The Adsorption of Cationic Dyes on Hydrated Zirconium Oxide".

Chemical Abstract 98:166426s "Adsorption Treatment of the Wastewater from Dye Synthesis".

Chemical Abstract 89:91421q (re: disclosure 1978, 171, 23).

Duwell et al., "The Preparation and Properties of Some Synthetic Inorganic Anion Exchangers," *Journal of Physical Chemistry*, 63, 2044–2047.

*Primary Examiner*—Robert Wax
*Attorney, Agent, or Firm*—Joe R. Prieto

[57] ABSTRACT

A water-insoluble pigment comprising a complex of an inorganic water-insoluble anion exchange material and a water-soluble dye is disclosed. The anion exchange material may be represented by the general formula:

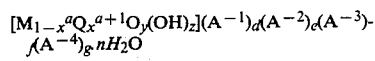

wherein M is a metal element or elements each with a positive valence of a; Q is a metal element or elements each with a positive valence of a+1; a is 2, 3, 4 or 5; $A^{-1}$, $A^{-2}$, $A^{-3}$, and $A^{-4}$ are each one or more exchangeable anions each having a negative valence of 1, 2, 3 and 4, respectively; x is $0 < x \leq 0.5$; and n, y, z, d, e, f, and g are real numbers greater than or equal to zero and satisfy the following:

$$2y + z = a$$

$$0 < d + 2e + 3f + 4g \leq x$$

$$0 \leq n \leq 10$$

provided that when y=0, a is not equal to 2.

40 Claims, No Drawings

INSOLUBLE PIGMENTS AND PREPARATION THEREOF

CROSS-REFERENCE TO RELATED APPLICATION

This application is a continuation-in-part application of copending application Ser. No. 748,275, filed June 24, 1985, now abandoned.

BACKGROUND OF THE INVENTION

This invention relates to pigments and, more particularly, this invention relates to water-insoluble pigments which are prepared from water-soluble dyes, and methods for making such pigments.

Pigments and dyes are known in the art as coloring agents and are useful in various applications such as for coloring cosmetics, soaps, food, paints, plastics and polymers. Dyes are generally liquids or soluble solids which are used in solution. Pigments, conversely, are generally solids and are usually insoluble in the medium in which the pigment is being used. Pigments are typically preferred over dyes in applications where color migration or bleeding is undesirable. For example, if a dye is used in a toothpaste formulation, the dye may be absorbed by the tongue, teeth and gums of the user. Similarly, in a two tone bar soap, a dye in one color section of the soap may migrate to a different color portion of the soap. Further, the soap dyes may stain the skin of the user as well as sink fixtures, etc. The use of an insoluble pigment prevents these undesirable occurrences.

Although there are a number of known water-insoluble pigments, some are considered to be unsuitable because they have been found to be questionable by government regulators on the ground of potential toxicity or carcinogenicity to the user. In addition, some insoluble pigments which are government-approved may suffer from a lack of color flexibility. These problems vary according to the use to which the pigments are put. In the case of soaps and cosmetics, for example, skin irritation may result from the incorporation of some known pigments.

Another example involves the use of water-insoluble pigments in food applications. While at present The U.S. Food and Drug Administration (FDA) has certified a number of dyes for this use, laboratory animal tests are now disclosing low level carcinogenicity of some of these dyes at high concentrations. This carcinogenicity is apparently due to the fact that the food dyes are absorbed by the body in the digestive tract. Currently available lakes (insolubilized food dyes) dissolve in the acidic environment of the stomach, releasing the dyes. Therefore, the FDA is considering decertification of the offending dyes and pigments made therefrom. As no replacements exist at present, the food processing industry may face major adjustments in its coloration expectations in the near future.

Related to food applications is the issue of the coloration of plastics that will be used in contact with food. Pending FDA regulation will require certification of any colorant used in contact with food, but current plastics colorants are for the most part unlikely to qualify for such certification, and dyes and pigments currently approved for food contact do not generally exhibit the chemical and thermal stability necessary for plastics processing.

A final problem encountered in the pigment and dye area is related to commercial desirability. In producing pigments from dyes, a loss of color brightness and intensity, along with hue changes, is encountered. While use of increase amounts of pigments will help to counteract these effects, the expensive cost of the dye precursor represents significant increases in costs associated with pigment production and, ultimately, of the soap, cosmetic, food, plastic or other polymer in which the colorant will be utilized.

Thus, it would be highly desirable to provide a nontoxic, noncarcinogenic, water-insoluble pigment which is suitable for use in body contact in ingestion and plastics processing applications and which has a relatively greater color flexibility. It would also be desirable to provide a method of preparing such a nontoxic, noncarcinogenic, chemically and thermally stable water-insoluble pigment.

SUMMARY OF THE INVENTION

In one aspect, the invention is a water-insoluble pigment comprising a complex of a water-insoluble, inorganic anion exchange material and a water-soluble dye, said anion exchange material represented by the general formula:

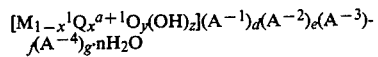

where M is a metal element or elements each with a positive valence of a; Q is a metal element or elements each with a positive valence of $a+1$; a is 2, 3, 4, or 5; $A^{-1}$, $A^{-2}$, $A^{-3}$, and $A^{-4}$ are each one or more exchangeable anions each having a negative valence of 1, 2, 3, and 4, respectively; x is $0 < x \leq 0.5$; and n, y, z, d, e, f, and g are real numbers greater than or equal to zero and satisfy the following:

$$2y + z = a$$

$$0 < d + 2e + 3f + 4g \leq x$$

$$0 \leq n \leq 10$$

provided that when $y = 0$, a is not equal to 2.

In another aspect, the invention is a method of preparing a water-insoluble pigment comprising contacting together the aforementioned water-insoluble, inorganic anion exchange material and a water-soluble dye. In yet another aspect, the invention is the pigment produced by the aforementioned method.

DESCRIPTION OF THE PREFERRED EMBODIMENTS

As used herein the term "pigment" is meant to include any substance, usually in finely divided (i.e., powder) form, that is highly colored and imparts color to another substance or mixture as a result of dispersion therein. The pigment is insoluble in an aqueous medium under normal conditions of use.

Preparation of pigments, according to the present invention, requires, as a first component, an anion exchange material, and as a second component, a water-soluble dye.

The anion exchange material of the present invention is essentially an inorganic material exhibiting anion exchange properties, i.e., anion exchange capacity, under normal conditions of use. The exchange materials are preferably metal oxides, hydrous metal oxides and metal hydroxides, and more preferably, mixed metal oxides, hydrous oxides or hydroxides. Examples of mixed metal oxides useful in the present invention are those described in U.S. Pat. No. 3,002,932. The preferred anion exchange materials used in the present invention and their method of preparation are those described in U.S. patent applications 748,231, filed 6-24-85, and 162,714, filed 3-1-88, and entitled "Inorganic Anion Exchangers and Preparation Thereof."

The anion exchange materials according to the present invention are essentially a combination of hydroxides, hydrated oxides, or oxides of pairs of metal elements. A first metal element of the pair of metal elements has a lower positive valence than that of a second metal element of the pair of metal elements. The first lower valent member has a positive valence lower by one integer than that of the second higher valent member of the pair. For example, if the first metal element has a valence of +2, the second metal element has a valence of +3; and if the first metal element has a valence of +3 then the second metal element has a valence of +4; and so on.

The first lower valent metal element of the compositions of the present invention is present in a major molar amount and the second higher valent metal element is present in a minor molar amount. It is theorized that the minor constituent is substituted in the lattice structure of the major constituent. The combination of the oxides and hydrated oxides of the pair of metal elements has a positive excess charge and this charge is balanced by an exchangeable anion or a mixture of two or more exchangeable anions.

The anion exchange material of the present invention may be described by the general formula:

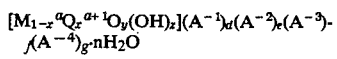

In the above equation, M is a metal element or elements each with a positive valence of a; Q is a metal element or elements each with a positive valence of a+1; a is 2, 3, 4, or 5; $A^{-1}$, $A^{-2}$, $A^{-3}$, and $A^{-4}$, are each one or more exchangeable anions with a negative valence of 1, 2, 3, and 4, respectively; x is $0<x>0.5$; and n, y, z, d, e, f, and g are real numbers greater than or equal to zero and satisfy the following:

$$2y+z=a$$

$$0<d+2e+3f+4g\leq x$$

$$0\leq n\leq 10$$

provided that when y=0, a is not equal to 2.

With reference to the above general formula, a "hydroxide" is represented by the formula when y=0; an "oxide" is represented by the formula when z=0; and a "partially hydrated oxide" is represented by the formula when y and z are both positive real numbers.

As an example of the composition of the present invention, the metal element or elements M each may have a valence of +2 and the metal element or elements Q each may have a valence of +3. The metal element M with a +2 valence may be selected from elements such as magnesium, calcium, strontium, barium, iron, cobalt, manganese, nickel, copper, zinc and mixtures thereof, and the metal element Q with a valence of +3 may be selected from elements such as aluminum, iron, chromium, gallium, cobalt, rhenium, indium and mixtures thereof.

Another example of a combination of metal elements illustrating the present invention is the metal element or elements M each having a valence of +3 such as those listed above and the metal element or elements Q each having a +4 valence including, for example, titanium, germanium, tin, lead, zirconium, hafnium, vanadium and mixtures thereof. Still another example of a combination of metal elements illustrating the present invention is the metal element or elements M each having a valence of +4 such as those listed above and the metal element or elements Q each having a +5 valence including, for example, antimony, vanadium, niobium, tantalum and mixtures thereof. Yet another example of a combination of metal elements illustrating the present invention is the metal element or elements M each having a +5 valence such as those listed above and the metal element or elements Q each having a +6 valence including, for example, chromium, molybdenum, tungsten and mixtures thereof.

Preferably, a pair of elements M and Q, selected from the group consisting essentially of aluminum, titanium, and magnesium, are used in the present invention. More preferably, mixed metal hydroxides, hydrated metal oxides and metal oxides of aluminum and titanium, and mixed metal hydroxides, hydrated metal oxides and metal oxides of magnesium and aluminum are used as the anion exchange material as herein described.

A preferred anion exchange material of the present invention comprising a combination of aluminum and titanium metal elements may be represented by the following general formula:

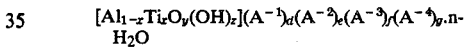

where $A^{-1}$, $A^{-2}$, $A^{-3}$, and $A^{-4}$ are each one or more exchangeable anions each having a negative valence of 1, 2, 3, and 4, respectively; x is $0<x\leq 0.5$; and n, y, z, d, e, f, and g are real numbers greater than or equal to zero and satisfy the following:

$$2y+z=3$$

$$0<d+2e+3f+4g\leq x$$

$$0\leq n\leq 10$$

Another preferred anion exchange material of the present invention comprising a combination of magnesium and aluminum metal elements may be represented by the following general formula:

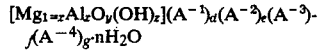

where $A^{-1}$, $A^{-2}$, $A^{-3}$, and $A^{-4}$ are each one or more exchangeable anions each having a negative valence of 1, 2, 3, and 4, respectively; x is $0<x\leq 0.5$; and n, z, d, e, f and g are real numbers greater than or equal to zero and satisfy the following:

$$2y+z=2$$

$$0<d+2e+3f+4g\leq x$$

$$0\leq n\leq 10$$

and y is a real number greater than zero.

The exchangeable anions of any of the anion exchange materials above may be selected from any inorganic or organic exchangeable anion commonly known in the art of anion exchangers. The exchangeable anions may be selected from monovalent, bivalent, trivalent, tetravalent anions or mixtures of two or more of these exchangeable anions. In the above formulas, the anion $A^{-1}$, for example, may be an inorganic anion selected from halides such as flourides ($F^{-1}$); chlorides ($Cl^{-1}$); iodides ($I^{-1}$); and bromides ($Br^{-1}$); carbonates such as $HCO_3^{-1}$; nitrates ($NO_3^{-1}$); sulfates such as $HSO_4^{-1}$; phosphates such as $H_2PO_4^{-1}$; permanganates ($MnO_4^{-1}$); hydroxides ($OH^{-1}$); and mixtures thereof. For example, the anion $A^{-1}$ may be a combination of two or more exchangeable anions described above such as a mixture of $Cl^{-1}$ and $HCO_3^{-1}$ anions. In the above formulas, the anion $A^{-2}$, for example, may be an inorganic anion selected from carbonates such as $CO_3^{-2}$; sulfates such as $SO_4^{-2}$ phosphates such as $HPO_4^{-2}$; and mixtures thereof. For example, the anion $A^{-2}$ may be a combination of two or more exchangeable anions described above such as mixtures of $SO_4^{-2}$ and $CO_3^{-2}$. In the above formulas, the anion $A^{-3}$, for example, may be a phosphate such as $PO_4^{-3}$. An example of the anion $A^{-4}$ used in the above formulas may include organic anions such as ethylenediaminetatraacetic acid (EDTA) and diphosphates such as

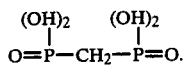

Other organic exchangeable anions used in the above formulas may include, for example, acetates, stearates, formates, benzoates and mixtures thereof.

In addition to the above anions used in the present invention, the compositions of the present invention may include a combination of two or more exchangeable anions selected from the group of $A^{-1}$, $A^{-2}$, $A^{-3}$, and $A^{-4}$ as described above. For example, the compositions may include a mixture of exchangeable anions such as $Cl^{-1}$ and $CO_3^{-2}$ anions or $Cl^{-1}$ and $SO_4^{-2}$ anions. The total negative charge of the exchangeable anion or mixture of exchangeable anions selected for the compositions should be sufficient to balance the excess positive charge of the metal oxides, hydrated oxides and hydroxides.

The second component of the present invention is a water-soluble dye. The term "dye", as used herein, is meant to include material that will bind, by an anion exchange mechanism, to the material to which it is applied and which will impart the appearance of a solid color to a formulation with which it is mixed. "Water-soluble dye" means that the dye is at least slightly soluble (i.e., at least about 0.01 weight percent soluble) in either pure neutral water, an aqueous salt solution, or an aqueous alkaline or acidic solution in which the dye remains chemically stable.

Any dye and mixtures of two or more dyes which will complex with the anion exchange material may be used. Preferably, the dyes used are those which are designated by the United States Food and Drug Administration (FDA) as Food, Drug and Cosmetic (FD&C) colors and Drug and Cosmetic (D&C) colors and mixtures thereof. For example, FD&C Blue No. 1, Blue No. 2, Green No. 3, Red No. 3, Yellow No. 5, Yellow No. 6, and mixtures thereof are preferred dyes. Examples of preferred D&C dyes include Green No. 8, Yellow No. 7, Yellow No. 10 and mixtures thereof. These dyes, and their structures and properties are well known to those skilled in the art. Further information may be obtained for instance, in "Kirk-Othmer Encyclopedia of Chemical Technology", Third Edition, Volume 6, pages 561–596.

In carrying out the method according to the present invention, the aforementioned anion exchange material is contacted with the dye under conditions in which a water-insoluble pigment is obtained. "Water-insoluble pigment" means that the pigment is not appreciably soluble (i.e., less than about 0.01 weight percent soluble) in either a pure neutral water, an aqueous salt solution, or an aqueous alkaline or acidic solution in which the pigment remains chemically stable. Desirably, the anion exchange material and the water-soluble dye may be contacted together in a liquid medium in which the dye has been dissolved. The dye may be dissolved in water and the anion exchange material added to the water. In another embodiment, the dye may be dissolved in water and then passed through a bed of anion exchange material in an ion-exchange column. Other methods which provide sufficient intimate contact between the dye and the anion exchange material may be used. Once the dye and anion exchange material are contacted together an insoluble complex forms almost immediately, generally in less than about 10 seconds.

The amount of anion exchange material and water-soluble dye used may vary. Typically, a ratio by weight of anion exchange material to water-soluble dye used is in the range of from about 1.5:1 to about 20:1.

Another method of preparing the pigment of the present invention is to precipitate the anion exchange material in the presence of the dye and other desired additives. The method may be carried out in a batch or continuous operation. Preferably, an aqueous solution of the dye and the other desired components is formed. Then an aqueous solution of the water-soluble salts of M and Q, such as previously described, is formed. Thereafter, a base such as sodium hydroxide or ammonia, the salt solution and the solution of the dye and other components are substantially simultaneously contacted together to form a precipitate. The precipitate is the pigment material according to the present invention. The metal salts of M and Q may be dissolved in water separately or together and thereafter contacted with the above solutions as described above. Sufficient base should be used to maintain the desired pH constant and to precipitate the anion exchange material.

The size of the pigment particles obtained can vary. Typically, for some applications, such as coloring agents for soaps, the particle size is preferably from about 200 angstroms to about 20 microns in diameter. The size of the precipitated particle obtained according to the present invention is preferably in the range of from about 200 angstroms to about 20 microns. The size of the particles can be controlled through techniques such as choice of reagents and controlled temperature, pH, concentration, and stirring speed during precipitation steps. It is also to be understood that larger size particles can be ground to the desired size.

The various pigments produced by the process of the present invention may be used separately and alone, or in combination with each other to form different color pigment materials. For example, a yellow pigment may be blended with a blue pigment to form a green pigment.

The pigments may be added to toiletries such as soaps (e.g., soap bars), toothpastes and cosmetics in amounts such that the desired color is obtained using techniques known in the art. The pigments of this invention can also be added to other items such as paints, plastics, polymers, fabric or food which are desirable to be colored.

When the pigments are to be used in plastics, one method of incorporation would be to use the pigment desired in either a dry powder form or as a paste or slurry in a suitable solvent. The particular solvent wil depend on the plastic used. The pigment is then added or mixed with the pellets or granules of either a thermoplastic or thermoset resin at the time of processing. Because of the significant thermal stability of pigments formed from insolubilized dyes by the formulation of the present invention, a number of processing methods may be employed. These include molding by methods such as: injection molding; compression molding; vacuum forming; blow molding; structural foam, including conventional low pressure, high pressure and expanding mold using either chemical or physical blowing agents; extrusion, including profile, pipe, wire and cable, sheet and coextrusion; coinjection molding; and thermoforming. The incorporation of the insoluble pigment is accomplished by whatever method would be used to incorporate a dye colorant into the selected high polymer, e.g., melt-blending. These pigments, upon being incorporated into the plastic material, are chemically and thermally stable. The insolubility of the dye is maintained throughout processing and in the final polymer material, so that the dye cannot be adsorbed onto any food with which it comes into contact. This feature will satisfy any FDA regulations and avoid any problems of suspected or actual carcinogenicity associated with dye ingestion. Typical applications will contain a level of pigment within the range of from about 0.001 to about 0.1 percent by weight, however, the pigment level will vary substantially according to the tint strength of the particular pigment, the resin selected, and a number of other variables.

When dyes are to be intentionally used as food colorants, insolubilization through the method of the present invention to produce pigments also provides some protection against physiological dangers that may be associated with the dye precursors themselves. It has been found that some of these pigments are stable in very acid pH environments, such as the stomach. The pigments possessing this stability, at low pH levels in particular, are those in which M, in any of the substrate formulas above, is aluminum and Q is titanium. Because a water-soluble dye complexed with a water-insoluble inorganic substrate of this formula remains insoluble throughout the digestive process, it cannot be absorbed into any bodily tissues in which it may cause harm. Typical levels of these pigments in food are small and usually vary from about 0.0001 percent to about 0.1 percent by weight.

The pigment produced by the present invention may be used in any of its applications alone or in combination with other additives which are not detrimental to the pigment properties. Other materials or components which may be mixed with the pigment may include, for example, fillers such as clays and extenders such as $TiO_2$, $Al_2O_3$, and $Al(OH)_3$ which will not substantially adversely affect the pigment properties. Other additives may be used, for example, to pelletize, agglomerate or coat the pigment, provided the pigment properties are not substantially adversely affected. The various additives used with the pigment will depend on the application in which the pigment is used.

In addition to using other materials as additives with the pigments of the present invention in a designated application, certain materials may be complexed with the pigment components to increase the efficacy of the colorant. One problem encountered with pigments made from insolubilized dyes is a loss of color brightness and intensity and also color hue changes occurring during the insolubilization process. An effective way of counteracting this problem is through the complexing of a water-soluble polymer with the basic pigment complex. Modified suspending agents such as cellulosic materials work particularly well. These include carboxymethyl methylcellulose, carboxymethylcellulose, and other water-soluble polymers with an anionic functionality. The polymer serves to stabilize the color hue and to maintain the original brightness and intensity of the dye precursor. An added advantage is that the polymer is insolubilized along with the other pigment components and thus does not affect the inert nature of the pigment particularly desired for many applications, such as in food, cosmetics, and food-contact plastics. The celluloses are of themselves generally physiologically inert.

It is preferable when adding a water-soluble polymer to use up to about 3 percent by weight of the polymer and up to about 40 percent by weight of the dye, the remainder being the inorganic anion exchange material. The reduced amount of dye needed to produce a pigment capable of imparting a given brightness level and hue stability represents a substantial cost savings in many applications, and the addition of the polymer does not affect other properties of the pigment, such as its chemical and thermal stability and physiological inertness.

The general preferred process for adding the water-soluble polymer comprises steps including dissolving the components of the selected inorganic anion exchange material in water; dissolving the water-soluble polymer in water; combining the two solutions with a source of alkalinity to precipitate the anion exchange material in the presence of the water-soluble polymer; and adding a selected water-soluble dye to the suspended precipitate. The pigment product may then be washed with suitable pH distilled water to remove excess reactants and by-products. Alternatively, the pigment can be completely synthesized first, then the water-soluble polymer added to it in aqueous solution.

The following examples are intended to illustrate the invention and are not intended to limit the scope thereof. In the examples, all parts and percentages are by weight unless otherwise specified. The soap used in the examples was conventional soap consisting essentially of 20 percent by weight sodium cocoate and 80 percent by weight sodium tallowate.

EXAMPLE 1

An anion exchange material for use in producing a pigment according to the present invention was prepared as follows:

An acidic solution was made by diluting 25 liters of a 28 percent $AlCl_3$ solution to 60 liters total volume with water. In addition, 1600 ml of $TiCl_4$ were added slowly to 2000 ml of water to obtain a clear solution. The $TiCl_4$ solution was then added to the $AlCl_3$ solution. A base solution was made by dissolving 9,000 g of NaOH in 60 liters of water. The anion exchange material was then made by a controlled precipitation in which the $AlCl_3$-$TiCl_4$ solution and the base solution were fed simultaneously into a 10 liter glass reactor in which the pH, temperature, stirring rate and reactant feed rates were controlled. The $AlCl_3$-$TiCl_4$ solution was introduced at 100 ml/min and the base feed rate was controlled to maintain a pH of 6.0±0.1. The temperature was kept at 90° C. and the stirring rate at 750 rpm. The first three reactor volumes of the reaction product were discarded and the remainder of the reaction product was collected, filtered, dried at 120° C. in an oven overnight, washed with water and redried at 120° C. for three hours.

The anion exchange material produced represented as $[Al_{0.8}Ti_{0.2}O(OH)]Cl_{0.2} \cdot nH_2O$, was a white, free-flowing powdery material having a substantially crystalline structure with uniform particle size of about 0.2 micron and an exchange capacity of 1.5 meq/g.

A 0.5 gram (g) portion of $[Al_{0.8}Ti_{0.2}O(OH)]Cl_{0.2} \cdot nH_2O$ obtained as described above was stirred with an aqueous solution of 0.01 g FD&C Blue No. 1 dye in 10 milliliters (ml) of distilled water. The resultant solids were filtered and washed repeatedly with distilled water to remove excess dye. The highly colored solids (pigment) showed an intense blue color which could not be removed by repeated washings.

EXAMPLE 2

A 0.1 g portion of the pigment prepared in Example 1 was added to 5 g of soap in 250 ml of water and stirred for 72 hours at room temperature (25° C.). Removal of the soap solids from the solution showed that the soap solids retained their original blue color and that no visually detectable color had been introduced into the solution.

EXAMPLE 3

An acidic solution was made by diluting 25 liters of a 28 weight percent (wt. %) $AlCl_3$ solution to 60 liters total volume with water. In addition, a $TiCl_4$ solution was made by adding 400 ml of $TiCl_4$ to 2000 ml of water to obtain a clear solution. The $TiCl_4$ solution was added to the previously prepared $AlCl_3$ solution to form an $AlCl_3$-$TiCl_4$ solution. A base solution was made by dissolving 9000 g of NaOH in 60 liters of water. Then the following precipitation reaction was carried out:

The $AlCl_3$-$TiCl_4$ solution and the base solution were fed simultaneously into a 10 liter glass reactor with stirring. The acid $AlCl_3$-$TiCl_4$ solution was added at a rate of 100 ml/min and the base solution was added at a rate which maintained the pH at 6.0±0.5. The temperature of the reaction was kept at 90° C. The first three reactor volumes of the reaction product were discarded and the remainder of the product was collected, filtered, and dried at 120° C. in an oven overnight. The reaction product, after drying, was then washed with water and redried at 120° C. for three hours.

A white, free-flowing powder product was obtained, having a substantially crystalline structure, a uniform particle size of approximately 0.2 micron and an exchange capacity of 0.5 meq/g. The approximate composition of the product was $[Al_{0.95}Ti_{0.05}O(OH)]Cl_{0.05} \cdot nH_2O$.

Thereafter, a 100 g portion of the $[Al_{0.95}Ti_{0.05}O(OH)]Cl_{0.05} \cdot nH_2O$ was exchanged with 50 g of $K_2SO_4$ in 500 ml of water. The exchanged material was then filtered, washed with distilled water, and dried at 110° C. for three hours in an oven. The dried material was calcined at 600° C. for three hours. The calcined material was allowed to cool to room temperature and was exchanged to a partial chloride form by three successive exchanges with saturated NaCl brine. The exchanged material was then washed with distilled water and dried at 110° C. for three hours.

A 10 g portion of the dried product was slurried in 200 ml of water. Then a dye solution containing 2 g of FD&C Blue No. 1 was added to the slurry with stirring. The resultant product was filtered, washed, and dried at 100° C. An intensely colored blue pigment was obtained which did not bleed color in an aqueous suspension.

EXAMPLE 4

An acidic solution was made by diluting 25 liters of a 28 wt. % $AlCl_3$ solution to 60 liters total volume with water. In addition, a $TiCl_4$ solution was made by adding 400 ml of $TiCl_4$ to 2000 ml of water to obtain a clear solution. The $TiCl_4$ solution was added to the previously prepared $AlCl_3$ solution to form an $AlCl_3$-$TiCl_4$ solution. A base solution was made by dissolving 9,000 g of NaOH in 60 liters of water. Then the following precipitation reaction was carried out:

The $AlCl_3$-$TiCl_4$ solution and the base solution were fed simultaneously into a 10 liter glass reactor with stirring. The acid $AlCl_3$-$TiCl_4$ solution was added at a rate of 100 ml/min and the base solution was added at a rate which maintained the pH at 6.0±0.5. The temperature of the reaction was kept at 90° C. The first three reactor volumes of the reaction product were discarded and the remainder of the product was collected, filtered, and dried at 120° C. in an oven overnight. The reaction product, after drying, was then washed with water and redried at 120° C. for three hours.

A white, free-flowing powder product was obtained, having a substantially crystalline structure, a uniform particle size of approximately 0.2 micron and an exchange capacity of 0.5 meq/g. The approximate composition of the product was $[Al_{0.95}Ti_{0.05}O(OH)]Cl_{0.05} \cdot nH_2O$.

A 10 g portion of the $[Al_{0.95}Ti_{0.05}O(OH)]Cl_{0.05} \cdot nH_2O$ was slurried in 200 ml of water. Then a dye solution containing 2 g of FD&C Blue No. 1 was added with stirring. The resultant product was filtered, washed, and dried at 100° C. An intensely colored blue pigment was obtained which did not bleed color in an aqueous suspension.

EXAMPLE 5

An acidic solution was made by diluting 25 liters of a 28 wt. % $AlCl_3$ solution to 60 liters total volume with water. In addition, a $TiCl_4$ solution was made by adding 3200 ml of $TiCl_4$ to 4,000 ml of water to obtain a clear solution. The $TiCl_4$ solution was added to the previously prepared $AlCl_3$ solution to form an $AlCl_3$-$TiCl_4$ solution. A base solution was made by dissolving 9,000 g of NaOH in 60 liters of water. Then the following precipitation reaction was carried out:

The $AlCl_3$-$TiCl_4$ solution and the base solution were fed simultaneously into a 10 liter glass reactor with stirring. The acid $AlCl_3$-$TiCl_4$ solution was added at a rate of 100 ml/min and the base solution was added at a rate which maintained the pH at 6.0±0.5. The temperature of the reaction was kept at 90° C. The first three reactor volumes of the reaction product were discarded and the remainder of the product was collected, filtered, and dried at 120° C. in an oven overnight. The reaction product, after drying, was then washed with water and redried at 120° C. for three hours.

A white, free-flowing powder product was obtained, having a substantially crystalline structure, a uniform particle size of approximately 0.2 micron and an exchange capacity of 1.7 meq/g. The approximate composition of the product was $[Al_{0.6}Ti_{0.4}O(OH)]Cl_{0.4} \cdot nH_2O$.

A 10 g portion of the $[Al_{0.6}Ti_{0.4}O(OH)]Cl_{0.4} \cdot nH_2O$ was slurried in 200 ml of water. Then a dye solution containing 2 g of FD&C Blue No. 1 was added with stirring. The resultant product was filtered, washed, and dried at 100° C. An intensely colored blue pigment was obtained which did not bleed color in an aqueous suspension.

EXAMPLE 6

An acidic solution was made by diluting 25 liters of a 28 weight percent $AlCl_3$ solution to 60 liters total volume with water. In addition, a $TiCl_4$ solution was made by adding 400 ml of TiCl to 2000 ml of water to obtain a clear solution. The $TiCl_4$ solution was added to the previously prepared $AlCl_3$ solution to form an $AlCl_3$-$TiCl_4$ solution. A base solution was made by dissolving 9,000 g of NaOH in 60 liters of water. Then the following precipitation reaction was carried out:

The $AlCl_3$-$TiCl_4$ solution and the base solution were fed simultaneously into a 10 liter glass reactor with stirring. The acid $AlCl_3$-$TiCl_4$ solution was added at a rate of 100 ml/min and the base solution was added at a rate which maintained the pH at 6.0±0.5. The temperature of the reaction was kept at 90° C. The first three reactor volumes of the reaction product were discarded and the remainder of the reaction product was collected, filtered, and dried at 120° C. in an oven overnight. The reaction product, after drying, was then washed with water and redried at 120° C. for three hours.

A white, free-flowing powder product was obtained, having a substantially crystalline structure, a uniform particle size of approximately 0.2 micron and an exchange capacity of 0.5 meq/g. The approximate composition of the product was $[Al_{0.95}Ti_{0.05}O(OH)]Cl_{0.05} \cdot nH_2O$.

Thereafter, a 100 g portion of the $[Al_{0.95}Ti_{0.05}O(OH)]Cl_{0.05} \cdot nH_2O$ was exchanged with 50 g of $K_2SO_4$ in 500 ml of water. The exchanged material was then filtered, washed with distilled water, and dried at 110° C. for three hours in an oven. The dried material was calcined at 600° C. for three hours. The calcined material was allowed to cool to room temperature and was exchanged to a partial chloride form by three successive exchanges with saturated NaCl brine. The exchanged material was then washed with distilled water and dried at 110° C. for three hours.

A 10 g portion of the dried product was slurried in 200 ml of water. Then a dye solution containing 2.0 g of D&C Green No. 8 was added with stirring. The resultant product was filtered, washed, and dried at 100° C. An intensely colored green pigment was obtained which did not bleed color in an aqueous suspension.

EXAMPLE 7

100 g of the anion exchange substrate is synthesized as described in Example 1. The substrate is slurried in 500 ml of water containing 5 g of carboxymethyl methylcellulose and stirred for several minutes. To the slurry is then added 10 g of D&C Green No. 8 dye dissolved in 200 ml of water. The pigment is then filtered, washed, and dried at 80° C. The product is a pigment with enhanced brightness as a pigment material.

EXAMPLE 8

A 1 g portion of the pigment material described in Example 1 is suspended in 200 ml of water and the pH dropped to 1.7 by the addition of HCl. After 10 minutes, the solid was removed by filtration. The filtrate showed less than 1 ppm dye present in solution.

What is claimed is:

1. A water-insoluble pigment comprising a complex of a water-insoluble inorganic anion exchange material and a water-soluble dye, said anion exchange material represented by the general formula:

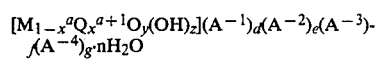

$$[M_{1-x}{}^aQ_x{}^{a+1}O_y(OH)_z](A^{-1})_d(A^{-2})_e(A^{-3})_f(A^{-4})_g \cdot nH_2O$$

where M is a metal element or elements each with a positive valence of a; Q is a metal element or elements each with a positive valence of $a+1$; a is 2, 3, 4, or 5; $A^{-1}$, $A^{-2}$, $A^{-3}$, and $A^{-4}$ are each one or more exchangeable anions each having a negative valence of 1, 2, 3, and 4, respectively; x is $0 < x \leq 0.5$; and n, y, z, d, e, f, and g are real numbers greater than or equal to zero and satisfy the following:

$2y+z=a$ $0 < d+2e+3f+4g \leq x$ $0 \leq n \leq 10$ provided that when $y=0$, a is not equal to 2.

2. The pigment of claim 1 wherein M is magnesium.
3. The pigment of claim 1 wherein M is aluminum.
4. The pigment of claim 1 wherein Q is aluminum.
5. The pigment of claim 1 wherein Q is titanium.
6. The pigment of claim 1 wherein M is selected from the group consisting of aluminum, titanium, and magnesium, and Q is selected from the group consisting of aluminum and titanium.
7. The pigment of claim 6 wherein M is magnesium and Q is aluminum.
8. The pigment of claim 6 wherein M is aluminum and Q is titanium.
9. The pigment of claim 1 wherein $A^{-1}$ is one or more anions selected from the group consisting of halides, hydroxides, nitrates, phosphates, hydrogen carbonates, hydrogen sulfates, and mixtures thereof; $A^{-2}$ is one or more anions selected from the group consisting of phosphates, carbonates, sulfates, and mixtures thereof; $A^{-3}$ is one or more anions consisting of phosphates; and $A^{-4}$ is one or more anions consisting of ethylenediaminetetraacetic acid, diphosphates, and mixtures thereof.
10. The pigment of claim 1 wherein $A^{-1}$ is selected from the group consisting of $Cl^{-1}$, $Br^{-1}$, $F^{-1}$, $I^{-1}$, $H_2PO_4^{-1}$ and mixtures thereof and e, f, and g are 0.
11. The pigment of claim 1 wherein $A^{-2}$ is selected from the group consisting of $SO_4^{-2}$, $CO_3^{-2}$, $HPO_4^{-2}$ and mixtures thereof and d, f, and g are 0.
12. The pigment of claim 1 wherein $A^{-1}$ is $Cl^{-1}$, $A^{-2}$ is $SO_4^{-2}$ and f and g are 0.
13. The pigment of claim 1 wherein the dye is an anionic dye.
14. The pigment of claim 13 wherein the dye is a sulfonated dye.

15. The pigment of claim 13 wherein the dye is a FD&C dye.

16. The pigment of claim 13 wherein the dye is a D&C dye.

17. The pigment of claim 15 wherein the dye is selected from the group consisting essentially of FD&C Blue No. 1, Blue No. 2, Green No. 3, Red No. 3, Yellow No. 6 and mixtures thereof.

18. The pigment of claim 16 wherein the dye is selected from the group consisting essentially of D&C Green No. 8, Yellow No. 7, Yellow No. 10 and mixtures thereof.

19. The pigment of claim 17 wherein the dye is FD&C Green No. 3.

20. The pigment of claim 18 wherein the dye is D&C Green No. 8.

21. A soap containing the pigment of claim 1.

22. A method of preparing a water-insoluble pigment comprising contacting together an inorganic water-insoluble anion exchange material with a water-soluble dye, said anion exchange material represented by the general formula:

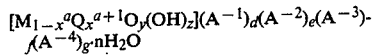

where M is a metal element or elements each with a positive valence of a; Q is a metal element or elements each with a positive valence of a+1; a is 2, 3, 4, or 5; $A^{-1}$, $A^{-2}$, $A^{-3}$, and $A^{-4}$ are each one or more exchangeable anions each having a negative valence of 1, 2, 3, and 4, respectively; x is $0 < x \leq 0.5$; and n, y, z, d, e, f, and g are real numbers greater than or equal to zero and satisfy the following:

$2y + z = a$ $0 < d + 2e + 3f + 4g \leq x$ $0 \leq n \leq 10$ provided that when y=0, a is not equal to 2.

23. A method comprising coprecipitating in an aqueous medium an inorganic mixed metal hydroxide, partially hydrated oxide or oxide of metal elements in the presence of a water-soluble dye.

24. The method of claim 23 wherein the coprecipitating is carried out by a continuous process.

25. The method of claim 24 wherein the coprecipitating is carried out by substantially simultaneously contacting a reaction solution of the metal elements, a base and a water-soluble dye.

26. The pigment of claim 25 wherein M is selected from the group consisting of aluminum, titanium, and magnesium, and Q is selected from the group consisting of aluminum and titanium.

27. The method of claim 26 wherein the metal elements are magnesium and aluminum.

28. The method of claim 26 wherein the metal elements are aluminum and titanium.

29. A pigment produced by the method of claim 22.

30. A pigment produced by the method of claim 23.

31. A thermoplastic resin containing the pigment of claim 1.

32. A thermoset resin containing the pigment of claim 1.

33. A food containing the pigment of claim 8.

34. The pigment of claim 1 wherein the complex also comprises a water-soluble polymer.

35. The pigment of claim 34 wherein said water-soluble polymer is a modified suspending agent.

36. The pigment of claim 35 wherein said modified suspending agent is a cellulose.

37. The method of claim 22 wherein a water-soluble polymer is also contacted.

38. The method of claim 23 wherein a water-soluble polymer is also coprecipitated.

39. A pigment produced by the method of claim 37.

40. A pigment produced by the method of claim 38.

* * * * *

UNITED STATES PATENT AND TRADEMARK OFFICE
CERTIFICATE OF CORRECTION

PATENT NO. : 4,769,079

DATED : September 6, 1988

INVENTOR(S) : Howard W. Clark; Tracy E. Chapman; and Ronald L. Yates

It is certified that error appears in the above-identified patent and that said Letters Patent is hereby corrected as shown below:

Column 2, line 27 please delete

"$[M_{1-x}{}^{1}Q_x{}^{a+1}O_y(OH)_z](A^{-1})_d(A^{-2})_e(A^{-3})_f(A^{-4})_g \cdot nH_2O$" and insert -- $[M_{1-x}{}^{a}Q_x{}^{a+1}O_y(OH)_z](A^{-1})_d(A^{-2})_e(A^{-3})_f(A^{-4})_g \cdot nH_2O$ --.

Column 3, line 44 please delete ">" and insert -- $\leq$ --.

Column 5, line 19 please delete "$SO_4^{-2}$" and insert -- $SO_4^{-2}$; --.

Column 5, line 26 please delete "ethylenediaminetatraacetic" and insert -- ethylenediaminetetraacetic --.

Column 7, line 11 please delete "wil" and insert -- will --.

Column 7, line 65 please delete "Al(OH)3" and insert -- $Al(OH)_3$ --.

Column 11, line 21 please delete "TiCl" and insert -- $TiCl_4$ --.

UNITED STATES PATENT AND TRADEMARK OFFICE
CERTIFICATE OF CORRECTION

PATENT NO. : 4,769,079

DATED : September 6, 1988

INVENTOR(S) : Howard W. Clark; Tracy E. Chapman; and Ronald L. Yates

It is certified that error appears in the above-identified patent and that said Letters Patent is hereby corrected as shown below:

Column 12, lines 53-54 please delete "phospates" and insert -- phosphates --.

Signed and Sealed this

Nineteenth Day of December, 1989

*Attest:*

JEFFREY M. SAMUELS

*Attesting Officer*     *Acting Commissioner of Patents and Trademarks*